(12) United States Patent
Rubin et al.

(10) Patent No.: US 8,597,386 B2
(45) Date of Patent: Dec. 3, 2013

(54) METHOD AND SYSTEM FOR CONTINUOUSLY PUMPING A SOLID MATERIAL AND METHOD AND SYSTEM FOR HYDROGEN FORMATION

(75) Inventors: David R. Rubin, Sayville, NY (US); John P. Dooher, Garden City, NY (US)

(73) Assignee: Alliant Techsystems Inc., Arlington, VA (US)

( * ) Notice: Subject to any disclaimer, the term of this patent is extended or adjusted under 35 U.S.C. 154(b) by 569 days.

(21) Appl. No.: 12/775,290

(22) Filed: May 6, 2010

(65) Prior Publication Data
US 2011/0272636 A1 Nov. 10, 2011

(51) Int. Cl.
*C01B 3/36* (2006.01)
(52) U.S. Cl.
USPC .......................................... 48/197 R
(58) Field of Classification Search
None
See application file for complete search history.

(56) References Cited

U.S. PATENT DOCUMENTS

| | | | | |
|---|---|---|---|---|
| 3,933,001 | A * | 1/1976 | Muska | 62/54.1 |
| 3,976,443 | A | 8/1976 | Paull et al. | |
| 4,127,008 | A * | 11/1978 | Tyree, Jr. | 62/62 |
| 4,166,731 | A * | 9/1979 | Staege | 62/54.2 |
| 4,191,028 | A * | 3/1980 | Audet et al. | 62/259.1 |
| 4,206,610 | A | 6/1980 | Santhanam | |
| 4,488,838 | A | 12/1984 | Herud | |
| 4,613,429 | A * | 9/1986 | Chiang et al. | 209/5 |
| 4,721,420 | A | 1/1988 | Santhanam et al. | |
| 4,765,781 | A * | 8/1988 | Wilks et al. | 406/197 |
| 4,995,234 | A * | 2/1991 | Kooy et al. | 60/648 |
| 5,715,702 | A * | 2/1998 | Strong et al. | 62/434 |
| 5,902,359 | A * | 5/1999 | Grosso et al. | 44/281 |
| 6,688,115 | B1 * | 2/2004 | Gershtein | 62/54.1 |
| 7,303,597 | B2 | 12/2007 | Sprouse et al. | |
| 2007/0107465 | A1 * | 5/2007 | Turner et al. | 62/613 |
| 2007/0297958 | A1 * | 12/2007 | Sprouse et al. | 422/232 |
| 2008/0071332 | A1 * | 3/2008 | Nelson et al. | 607/89 |
| 2008/0193299 | A1 * | 8/2008 | Oglesby | 417/53 |
| 2009/0110578 | A1 | 4/2009 | Amburgey et al. | |
| 2010/0050687 | A1 * | 3/2010 | Hees | 62/532 |

FOREIGN PATENT DOCUMENTS

DE  26 48 048 A1  4/1978

OTHER PUBLICATIONS

PCT International Search Report, International Application No. PCT/US2011/035579, mailed Jul. 22, 2011, five (5) pages.
Written Opinion of the International Searching Authority, EPO, International Application No. PCT/US2011/035579, mailed Jul. 22, 2011, seven (7) pages.
Investigation of Low-Rank-Coal-Liquid Carbon Dioxide Slurries, EPRI AP-4849, Project 2469-1, Final Report, Oct. 1986, 136 pages, Electric Power Research Institute, Palo Alto, California.

* cited by examiner

*Primary Examiner* — Imran Akram
(74) *Attorney, Agent, or Firm* — TraskBritt

(57) ABSTRACT

A method of continuously providing a pressurized slurry of a solid material and liquid carbon dioxide is disclosed. The method comprises mixing particles of the solid material and particles of solid carbon dioxide in a mixing container and feeding the mixture of the solid material and the solid carbon dioxide to a pump to form a slurry of the solid material and liquified carbon dioxide. Within the pump, the solid carbon dioxide sublimates, forming a gaseous carbon dioxide that subsequently liquefies due to an increase in pressure. The liquid carbon dioxide and the solid material then mix to form the slurry of the solid material and the liquid carbon dioxide. In some embodiments, the pressurized slurry may be used for pipeline transportation of the solid material. A system of producing a continuous pressurized slurry of solid material and liquid carbon dioxide is also disclosed. A method of producing hydrogen is also disclosed.

21 Claims, 4 Drawing Sheets

METHOD AND SYSTEM FOR CONTINUOUSLY PUMPING A SOLID MATERIAL AND METHOD AND SYSTEM FOR HYDROGEN FORMATION

TECHNICAL FIELD

The present invention relates to a method and system of continuously pumping a solid material. More specifically, embodiments of the present invention relate to a method and a system of continuously pumping a solid material by mixing the solid material with carbon dioxide to form a slurry within a pump, and to a method and system for forming hydrogen.

BACKGROUND

Many processes require a pressurized feed of a solid material. For example, power generation systems typically require a high pressure coal feed. To assist in pressurizing the solid material, the solid material may be mixed with a carrier fluid, such as water, to form a slurry. The slurry includes particles of the solid material suspended in the carrier fluid. The slurry can then be pumped and pressurized to a required high pressure.

Coal and water are one type of common pressurized slurry. However, the pressurized slurries of coal and water are typically highly viscous, thus increasing the pressurization and transport of such slurries. In addition, by using water as the carrier fluid of the slurry, there may be energy penalties (i.e., losses of energy due to the heating of the water) in processes that require thermally processing the slurry.

Various systems have been developed to provide a high pressurized feed of solid material; however, there are currently no reliable systems for providing a continuous supply of the high pressure feed of solid material. One system commonly used to pressurize a solid feed stream is a lock hopper feeder system. With this type of system, the hoppers containing the solid are first pressurized and then emptied into a pressurized system. After a first hopper is emptied, the system is closed, then a second hopper is pressurized and then emptied into the pressurized system. Because each hopper must be pressurized before being introduced into the pressurized system, this system provides only a substantially discontinuous feed of the pressurized solid.

Accordingly, there exists a need for a method and system that will enable an efficient, continuous pumping of a solid material.

BRIEF SUMMARY OF THE INVENTION

The present invention relates to a method of continuously producing a pressurized slurry of a solid material and liquid carbon dioxide. The method comprises mixing particles of the solid material and particles of solid carbon dioxide in a mixing container, and feeding the mixture of the solid material and the solid carbon dioxide to a pump to form a slurry of the solid material and liquid carbon dioxide. In some embodiments, feeding the mixture of the solid material and the solid carbon dioxide to a pump to form a slurry of the solid material and liquid carbon dioxide comprises sublimating the solid carbon dioxide to form a gaseous carbon dioxide, increasing the pressure to liquefy the gaseous carbon dioxide to form a liquid carbon dioxide; and mixing the liquid carbon dioxide and the solid carbon dioxide to form the slurry of the solid material and the liquid carbon dioxide. In some embodiments, the solid material comprises at least one of coal and particles of an abrasive material.

Further embodiments of the present invention include a method of continuously producing a pressurized slurry comprising feeding a mixture of a solid material and solid carbon dioxide into a first cavity of a progressive cavity pump, sublimating at least a portion of the solid carbon dioxide within the first cavity to form a gaseous carbon dioxide, increasing the pressure in a second cavity of the progressive cavity pump, liquefying at least a portion of the carbon dioxide within the second cavity to form a liquid carbon dioxide, and mixing the liquid carbon dioxide and the solid material in a third cavity of the progressive cavity pump to form a pressurized slurry. The mixture of the solid material and solid carbon dioxide may be fed to the first cavity of the progressive cavity pump at an ambient pressure. The pressurized slurry formed in the third cavity of the progressive cavity pump may have a pressure of at least about 830 psi (5723 kPa).

In additional embodiments of the present invention, a method and system for continuously forming hydrogen from a pressurized slurry is disclosed. The method includes forming a continuous pressurized slurry comprising mixing particles of the solid material and particles of solid carbon dioxide in a mixing container, and feeding the mixture of the solid material and the solid carbon dioxide to a pump to form the continuous pressurized slurry, feeding the continuous pressurized slurry to a high pressure reactor to form hydrogen and carbon dioxide and separating the hydrogen and carbon dioxide. In some embodiments, at least a portion of the carbon dioxide may be recycled to form the pressurized slurry.

In association with the methods of this invention, a system of continuously producing a pressurized slurry is also provided. The system includes a mixer configured to mix a solid material and solid carbon dioxide and a pump coupled to the mixer configured to sublimate the solid carbon dioxide to form a gaseous carbon dioxide, increase the pressure in the pump to cause the gaseous carbon dioxide to liquefy, and to form a slurry of the solid material and liquid carbon dioxide. In further embodiments, the system comprises a supply of liquid carbon dioxide and a spray nozzle configured to disperse particles of the pressurized liquid carbon dioxide into the mixer.

These and other aspects of the present invention will be discussed in greater detail hereinafter.

BRIEF DESCRIPTION OF THE DRAWINGS

While the specification concludes with claims particularly pointing out and distinctly claiming that which is regarded as the present invention, advantages of this invention may be more readily ascertained from the following detailed description when read in conjunction with the accompanying drawings in which:

DETAILED DESCRIPTION

Some of the illustrations presented herein are not meant to be actual views of any particular material, device, or system, but are merely idealized representations that are employed to describe the present invention. Additionally, elements common between figures may retain the same numerical designation.

The present invention generally relates to a system and a method of continuously producing a pressurized slurry of a solid material and liquid carbon dioxide. A continuous feed of particles of the solid material and a continuous feed of solid carbon dioxide, or dry ice, particles are combined in a mixing container. The combined solid material and solid carbon dioxide are then fed to a pump where the solid carbon dioxide sublimates into a gas that is subsequently liquidized, forming the pressurized slurry of the solid material and liquid carbon dioxide. The pressurized slurry of the solid material and liquid carbon dioxide may be fed directly to a high pressure process.

The system and method of continuously producing the pressurized slurry of solid material and liquid carbon dioxide of the present invention may be used to form a pressurized slurry of any solid material in which a continuous high pressure feed of the solid material is desirable. As a non-limiting example, in one embodiment the solid material stream may comprise coal. One embodiment of a system and method for continuously producing a pressurized slurry of coal and liquid carbon dioxide is described in greater detail below regarding FIG. 4. In another embodiment, the solid material may comprise particles of an abrasive material such as an abrasive grit material. Such particles of abrasive materials may be sprayed onto an adhesive sheet. The particles of abrasive material adhere to the adhesive sheet while the liquid carbon dioxide sublimates, forming a sandpaper-type material. In another embodiment, the solid material may be a mineral of value such as, for example, sulfur, petroleum coke, and limestone. The pressurized slurry of solid material and liquid carbon dioxide formed using the system and method of the present invention may be fed to a slurry pipeline for transportation to a desired location.

Figure 1:
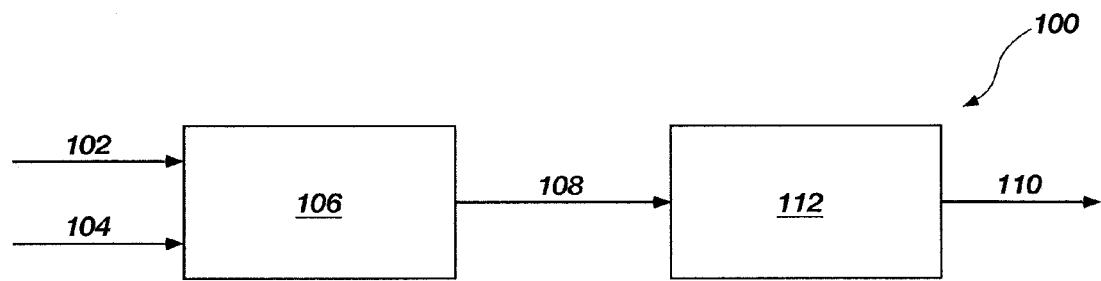
FIGS. 1 and 2 are simplified schematics of a system for continuously producing a high pressure slurry of a solid material and liquid carbon dioxide according to particular embodiments of the invention.

An embodiment of a continuous solid material pumping system 100 of the present invention is shown in the simplified schematic diagram illustrated in FIG. 1. The continuous solid material pumping system 100 includes a mixing container 106 for receiving a solid material stream 102 and a solid carbon dioxide material stream 104. The solid material stream 102 and the solid carbon dioxide material stream 104, in the form of particles of each, are mixed in the mixing container 106, forming a mixed solid material and solid carbon dioxide stream 108. The mixed solid material and solid carbon dioxide stream 108 is fed to a progressive cavity pump 112. Within the progressive cavity pump 112, at least a portion of the solid carbon dioxide sublimates to form a gaseous carbon dioxide. The combined pressure increase from the gaseous carbon dioxide and compression provided by the progressive cavity pump 112 causes the gaseous carbon dioxide to liquefy forming a liquid carbon dioxide. The liquid carbon dioxide mixes with the solid material, forming a pressurized slurry of the solid material and the liquid carbon dioxide that exits the progressive cavity pump 112 as a pressurized slurry stream 110.

The solid material stream 102 may be formed of very fine particulates to provide for efficient delivery of the solid material stream 102 to the mixing container 106 and to facilitate a roughly equal dispersion of the solid material stream 102 and the solid carbon dioxide material stream 104 in the mixing container 106. In one embodiment, the solid material stream 102 may include particles having a particle size distribution so that about 70% to about 90% of the solid material stream 102 passes through an ASTM No. 200 U.S.A. standard testing sieve as defined in ASTM Specification E11-04, which is entitled *Standard Specification for Wire Cloth and Sieves for Testing Purposes*. The solid carbon dioxide material stream 104 may also be formed of very fine particulates. In one embodiment, the solid carbon dioxide material stream 104 may be formed of small snow-flake like particles having a diameter less than about 20 mm. For example, the solid carbon dioxide material stream 104 may be formed of particles having a diameter from about 1 mm to about 10 mm.

Figure 2:
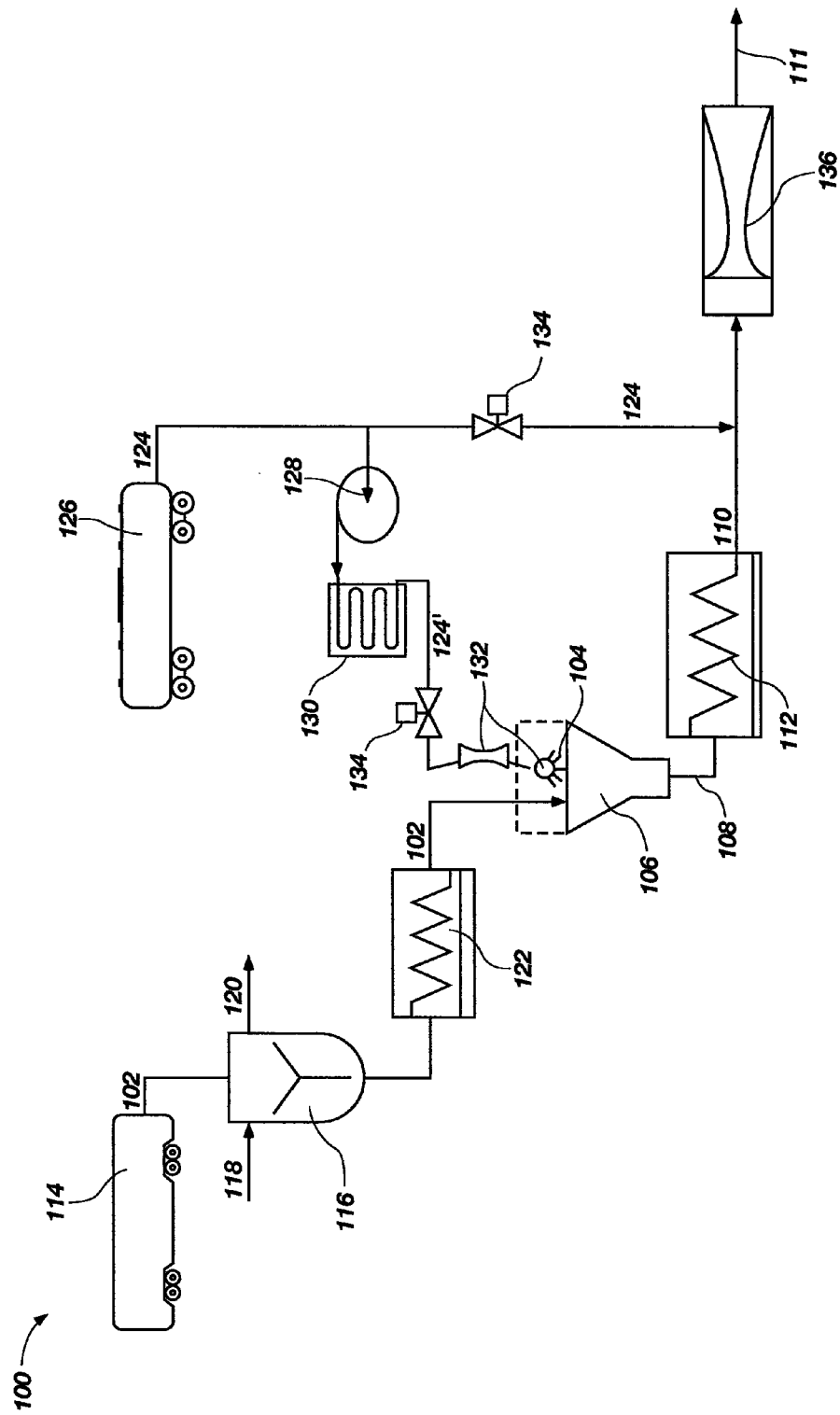

FIG. 2 illustrates a more detailed schematic of one embodiment of the continuous solid material pumping system 100 of FIG. 1. As shown in FIG. 2, the solid material stream 102 may be fed from a bulk solid material delivery source 114 to a sealed hopper 116. The solid material stream 102 may be transported from the bulk solid material delivery source 114 to the sealed hopper 116 via a vibration unit (not shown) or other transportation means as known in the art. The solid material stream 102 may be provided from the bulk solid material delivery source 114 as fine particulates, or, alternatively, a combination of crushing and grinding equipment (not shown) may be used to pulverize the solid material of the stream 102 before the solid material stream 102 enters the sealed hopper 116.

A gaseous carbon dioxide stream 118 may be fed to the sealed hopper 116 to purge atmospheric air trapped in interstitial spaces between particles of the solid material. The atmospheric air exits the sealed hopper 116 as an atmospheric air and gaseous carbon dioxide stream 120. The sealed hopper 116 may be maintained at about ambient pressure, 14.6 psi (101.3 kPa), by controlling the flow rates of the gaseous carbon dioxide stream 118 and the atmospheric air and gaseous carbon dioxide stream 120. The sealed hopper 116 may include a shaker or agitator (not shown) or other material conveyance apparatus to transport the solid material through the sealed hopper 116 to the mixing container 106. In some embodiments, a solid material conveyor 122, such as a screw auger may be used to continuously transport the solid material stream 102 to the mixing container 106.

Also shown in FIG. 2, a liquid carbon dioxide stream 124 may be supplied from a bulk carbon dioxide delivery source 126. Carbon dioxide is a byproduct of many chemical processes including power production. The bulk carbon dioxide delivery source 126 may, therefore, be supplied with carbon dioxide from a carbon dioxide source that may otherwise have required sequestering of the carbon dioxide byproduct. The liquid carbon dioxide stream 124 may be thermally manipulated to form particles of solid carbon dioxide. For example, in one embodiment, the liquid carbon dioxide stream 124 is supplied from the bulk carbon dioxide delivery source 126 at a pressure ranging from about 145 psi (1013 kPa) to about 294 psi (2026 kPa) and a temperature of about −30° C. to about −15° C. The liquid carbon dioxide stream 124 is transported to a refrigeration unit 130 via a pump 128. The temperature of the liquid carbon dioxide stream 124 is cooled in the refrigeration unit 130, forming a cooled liquid carbon dioxide stream 124'. The cooled liquid carbon dioxide stream 124' may be at or below about the triple point temperature of carbon dioxide, about −56° C. The triple point temperature is the temperature at which the carbon dioxide may be present in more than one phase, for example, the carbon dioxide may be present as a gas, a solid, and a liquid simultaneously. The cooled liquid carbon dioxide stream 124' is then directed through a spray nozzle 132 into the mixing container 106. As the cooled liquid carbon dioxide stream 124' passes through the spray nozzle 132, droplets of the liquid carbon dioxide adiabatically expand in the mixing container 106, which may be maintained at about ambient pressure, forming the solid carbon dioxide material stream 104. The spray nozzle 132 may be configured to produce a fine mist of the cooled liquid carbon dioxide stream 124' so that the solid carbon dioxide material stream 104 is formed as a stream of fine snowflake-like material. A control valve 134 may be used to control the flow rate of the cooled liquid carbon dioxide stream 124' to the spray nozzle 132. In some embodiments, a commercially available dry ice maker or dry ice blaster may be used to form the solid carbon dioxide material stream 104. Such dry ice makers and dry ice blasters are commercially available from numerous sources including, but not limited to, Cold Jet, LLC (Loveland, Ohio) and IceTech America, Inc. (West Chester, Ohio).

The particles of solid material stream 102 and of the solid carbon dioxide material 104 are mixed in the mixing container 106 to form the mixed solid material and solid carbon dioxide stream 108. The mixed solid material and solid carbon dioxide stream 108 may comprise an at least substantially homogenous mixture formed of the solid material stream 102 and the solid carbon dioxide material stream 104. In one embodiment, the mixed solid material and solid carbon dioxide stream 108 may be formed of about 60 wt % to about 80 wt % solid material and about 40 wt % to about 20 wt % solid carbon dioxide. The temperature and the pressure of the mixing container 106 may be controlled to maintain the solid carbon dioxide material stream 104 in a solid state within the mixing container 106. In some embodiments, the adiabatic expansion of the cooled liquid carbon dioxide stream 124' provides enough cooling capacity to maintain the solid carbon dioxide material stream 104 in the solid state within the mixing container 106.

Figure 3:
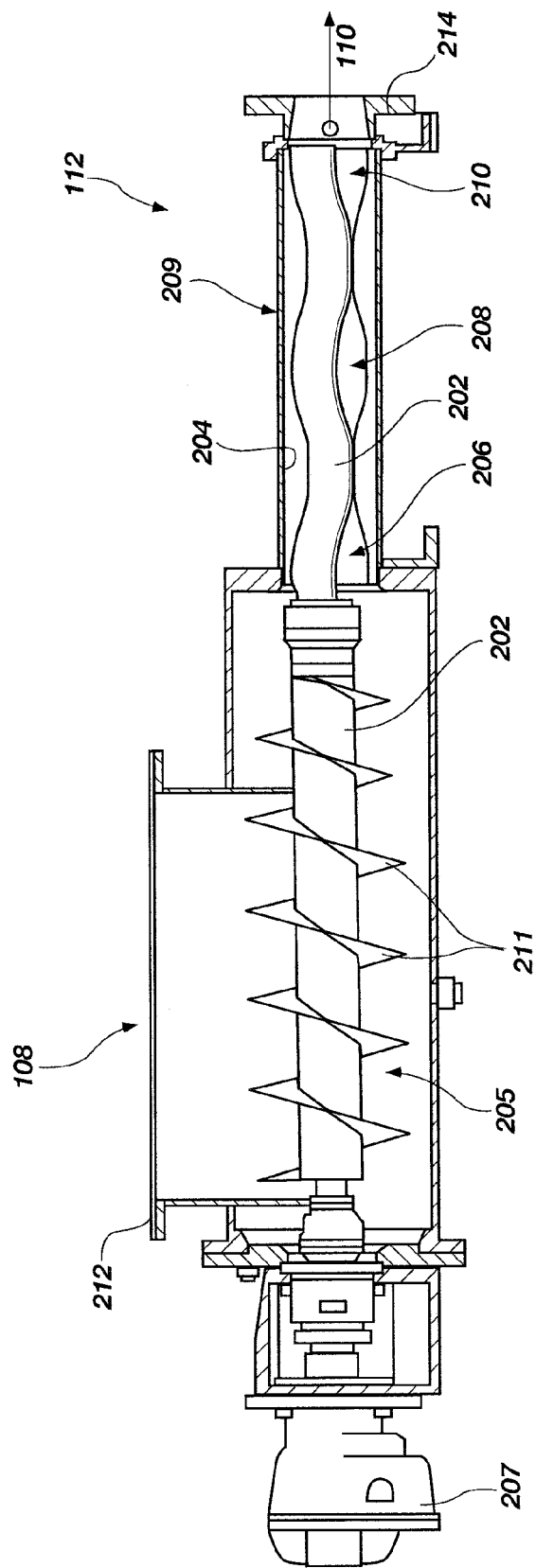
FIG. 3 is a schematic representation of a partial internal view of a progressive cavity pump according to one embodiment of the invention.

The mixed solid material and solid carbon dioxide stream 108 from the mixing container 106 is fed to the progressive cavity pump 112. The progressive cavity pump 112 may be a suitable positive displacement pump known in the art including, for example, a Moineau-type pump or an auger pump. Such positive displacement pumps are commercially available from numerous sources including, but not limited to, Moyno, Inc. (Springfield, Ohio) and Seepex GmbH (Battrop, Germany). FIG. 3 illustrates an enlarged partial internal view of one embodiment of the progressive cavity pump 112. As shown in FIG. 3, the progressive cavity pump 112 includes a first cavity 206, a second cavity 208, and a third cavity 210. However, in some embodiments, the progressive cavity pump 112 may include more than three cavities, such as, for example, four to fifteen cavities. The number of cavities of the progressive cavity pump 112 will vary based on the desired pressure and phase characteristics of the pressurized slurry 110.

The progressive cavity pump 112 includes an inlet 212 for receiving the mixed solid material and solid carbon dioxide stream 108 and an outlet 214 for removing the pressurized slurry 110. The progressive cavity pump 112 also includes a rotor 202 that is driven by a motor 207. The progressive cavity pump 112 may include a feed auger portion 205 and a pumping portion 209. The feed auger portion 205 may include, for example, blades 211 attached to the rotor 202 that mechanically force the mixed solid material and solid carbon dioxide stream 108 to the pumping portion 209. Within the pumping portion 209, the rotor 202 forms a tight, substantially continuous seal with the inner surface of an elastomeric stator 204 forming the cavities 206, 208, and 210 between the rotor 202 and the elastomeric stator 204. The cavities 206, 208, and 210 move longitudinally (i.e., the first cavity 206 becomes the second cavity 208 and the second cavity 208 becomes the third cavity 210) through the pumping portion 209 of progressive cavity pump 112 as the rotor 202 is rotated in cooperation with the engaged inner surface of the elastomeric stator 204, but the shapes and volumes of the cavities 206, 208, and 210 remain constant.

As shown in FIG. 3, the mixed solid material and solid carbon dioxide stream 108 is introduced into progressive cavity pump 112 through the inlet 212 and progresses through the steer auger portion 205 to the first cavity 206 of the pumping portion 209. Within the first cavity 206, the temperature of the solid carbon dioxide increases, causing the solid carbon dioxide to sublimate forming a gaseous carbon dioxide. The gaseous carbon dioxide exhibits a pressure up to 800 times that of the solid carbon dioxide. In some embodiments, heat is transferred from the solid material to the solid carbon dioxide causing the increase in temperature and subsequent sublimation of the solid carbon dioxide. For example, the solid material stream 102 in the mixed solid material and solid carbon dioxide stream 108 may be at about 20° C. and the solid carbon dioxide material stream 104 in the mixed solid carbon dioxide stream 108 may be at about −78° C. The heat transferred from solid material to the solid carbon dioxide may increase the temperature of the solid carbon dioxide to about −40° C., at which point the solid carbon dioxide sublimates. As the solid carbon dioxide sublimates, the pressure in the first cavity 206 may increase up to about 400 psi.

The pressure increase from the gaseous carbon dioxide combined with the compressive force of the pumping action from the pumping portion 209 of the progressive cavity pump 112 causes the gaseous carbon dioxide to liquefy within the second cavity 208, forming a liquid carbon dioxide. In some embodiments, the pressure in the second cavity 208 may increase up to about 900 psi. The temperature of the carbon dioxide and the solid material may both be about −40° C. in the second cavity 208.

The liquid carbon dioxide mixes with the solid material in the third cavity 210 producing the pressurized slurry. The pressurized slurry exits the progressive cavity pump 112 through the outlet 214. In some embodiments, the pressure in the third cavity 210 may be up to about 1000 psi. The temperature of the carbon dioxide and the solid material may remain at about −40° C. in the third cavity.

While the phase change characteristics of the carbon dioxide are described with respect to specific cavities 206, 208, 210, it is understood that the sequence of phase changes of the carbon dioxide may take place anywhere throughout the progressive cavity pump 112.

Referring back to FIG. 2, additional liquid carbon dioxide from the liquid carbon dioxide stream 124 may be fed to the pressurized slurry as desired via a control valve 134. A back pressure regulator 136 may be placed after the progressive cavity pump 112 to maintain the pressurized slurry 110 above the liquefaction pressure of the liquid carbon dioxide. In one embodiment, the back pressure regulator 136 may be set to maintain the pressurized slurry 110 at a pressure of about 840 psi (5723 kPa) to about 1000 psi (6895 kPa) at about 20° C. to about 30° C. The pressurized slurry 110 may then be processed as desired or, in some embodiments, the pressurized slurry 110 may be fed to a pipeline 111 to transport the pressurized slurry to a desired location, such as a factory.

The continuous solid material pumping system 100 of the present invention may offer at least one of several advantages over other solid material pumping systems known in the art. For example, conventional solid material pumping system technologies combine a liquid carbon dioxide with the solid material to form a slurry. However, by combining the solid carbon dioxide material stream 104 with the solid material stream 102 the continuous solid material pumping system 100 utilizes the phase change properties of the carbon dioxide to increase the pressure of the pressurized slurry 110. Accordingly, the continuous solid material pumping system 100 of the present invention utilizes fewer pumps and pressurizing apparatuses than a conventional solid material pumping system. Furthermore, conventional solid material pumping systems, such as a lock hopper system, require pressurization of the solid material before mixing the solid material and the liquid carbon dioxide in order to prevent a large pressure drop and gasification of the liquid carbon dioxide. Such pressurization of the solid material is performed in batch operations via lock hopper assemblies, thus preventing a continuous feed of the solid material. Conversely, the solid material pumping system 100 of the present invention does not require pre-pressurization of the solid material stream 102 and, thus, the continuous solid material pumping system 100 of the present invention may be used to provide a continuous feed of the solid material stream 102. Furthermore, the carbon dioxide used to form the pressurized slurry 110 may be a recycled byproduct from other processes, eliminating the need to sequester the carbon dioxide.

Figure 4:
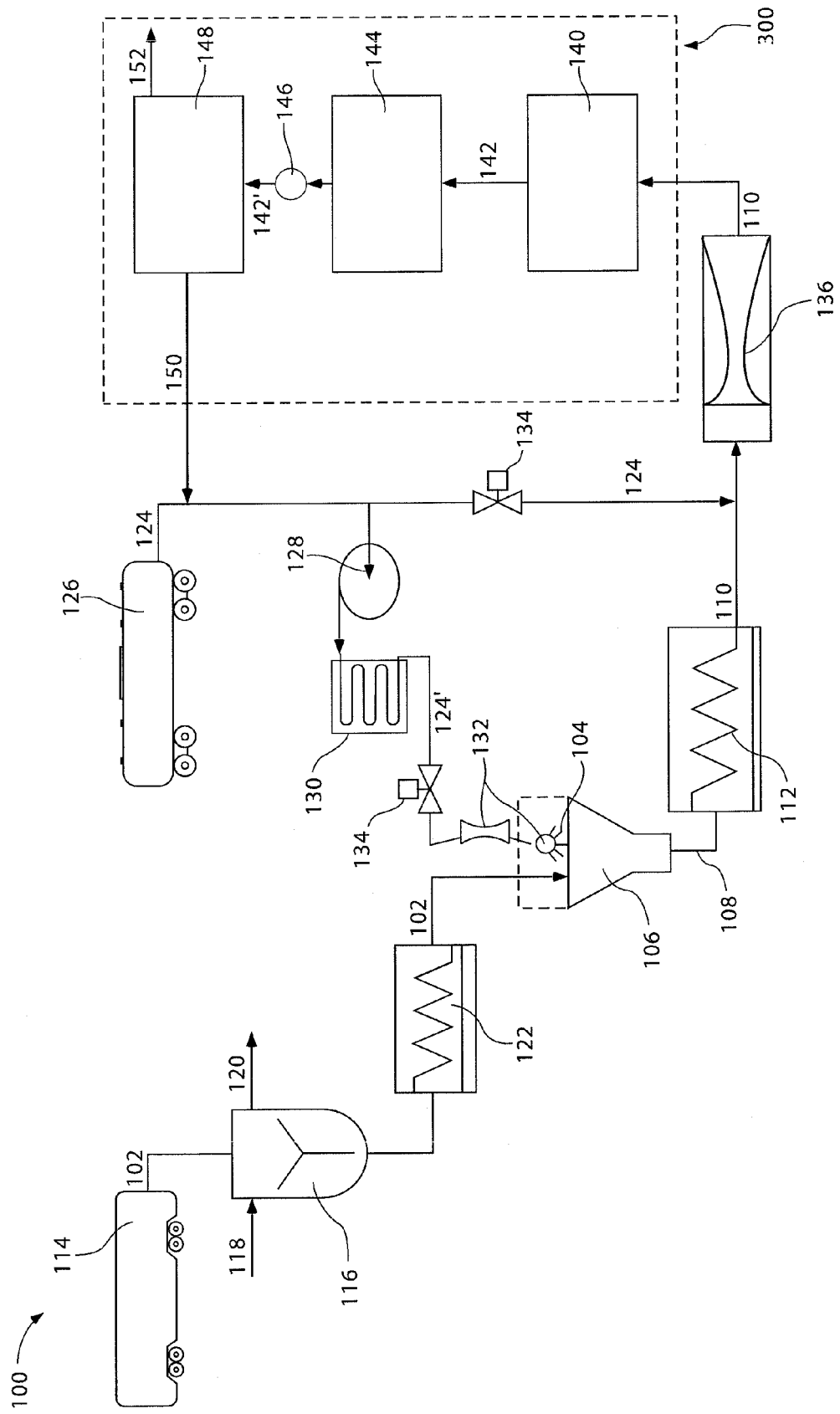
FIG. 4 is a simplified schematic of the system of FIG. 2 including a combustion and separation system according to one embodiment of the invention.

FIG. 4 is a schematic drawing of one embodiment of the continuous solid material pumping system 100 of FIG. 2 further comprising a combustion and separation system 300. In the embodiment of FIG. 4, the solid material stream 102 comprises a combustible solid material, low-rank-coal being one example. The pressurized slurry 110 produced by the continuous solid material pumping system 100 is fed to a high pressure reactor 140, such as a slurry-fed gasifier. The pressurized slurry 110 may be fed to the high pressure reactor 140 through a spray nozzle (not shown). Feeding the pressurized slurry 110 through the spray nozzle may help improve the rate of combustion of the solid material within the pressurized slurry 110 rather than feeding the pressurized slurry 110 as a bulk fluid. The solid material is combusted in the high pressure reactor 140, producing a syngas 142. The syngas 142 comprises a mixture of hydrogen gas and gaseous carbon dioxide. In one embodiment, the syngas 142 may be about 66% hydrogen gas and about 33% gaseous carbon dioxide by volume. The syngas 142 may then be cooled via a heat exchanger 144 and the components thereof separated via a separator 148. The heat exchanger 144 may be used to cool the syngas 142 to about 20° C. and a pump 146 may be used to pressurize the cooled syngas 142 above the liquefaction pressure of the gaseous carbon dioxide, about 830 psi (5723 kPa) to form a two-phase syngas 142'. Heat absorbed by the heat exchanger 144 during cooling of the syngas may be recycled and used to promote other processes of the continuous solid material pumping system 100. The cooling and pressurizing of the syngas 142 forms a two-phase syngas 142' wherein the carbon dioxide is present as a liquid and the hydrogen is a gas. The two-phase syngas 142' may then be sent to the separator 148 to separate the liquid carbon dioxide and the hydrogen gas, forming a recycled liquid carbon dioxide stream 150 and a hydrogen gas stream 152. At least a portion of the recycled liquid carbon dioxide stream 150 may be combined with the liquid carbon dioxide stream 124 and fed to the continuous solid material pumping system 100.

The combustion and separation system 300 of FIG. 4 may be as much as 4% more efficient at converting coal to hydrogen than a conventional coal and water slurry pumping system. Conventional coal and water slurry pumping systems consume significantly larger quantities of oxygen than a coal and liquid carbon dioxide slurry. Also, because the continuous solid material pumping system 100 provides a continuous feed of the pressurized slurry 110 to the high pressure reactor 140, no heat or oxygen is lost caused by a break in the feed to the reactor.

The invention has been described herein in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method, comprising:
mixing particles of a solid material and particles of solid carbon dioxide in a mixing container to form a mixture of the solid material and the solid carbon dioxide;
feeding the mixture of the solid material and the solid carbon dioxide into a progressive cavity pump;
sublimating the solid carbon dioxide within the progressive cavity pump to form gaseous carbon dioxide;
increasing pressure within the progressive cavity pump to liquefy the gaseous carbon dioxide to form liquid carbon dioxide; and
mixing the liquid carbon dioxide and the solid material within the progressive cavity pump to form a slurry of the solid material and liquid carbon dioxide.

2. The method of claim 1, wherein sublimating the solid carbon dioxide to form a gaseous carbon dioxide increases the pressure in the pump to a liquefaction pressure of the gaseous carbon dioxide.

3. The method of claim 1, wherein mixing particles of a solid material and particles of solid carbon dioxide in a mixing container comprises mixing about 60 wt. % solid material and about 40 wt. % solid carbon dioxide.

4. The method of claim 1, wherein mixing particles of a solid material and particles of solid carbon dioxide in a mixing container comprises feeding a continuous feed of the particles of the solid material to the mixing container.

5. The method of claim 4, further comprising replacing atmospheric air from interstitial regions in the continuous feed of the particles of the solid material with a gaseous carbon dioxide.

6. The method of claim 4, wherein feeding a continuous feed of the particles of the solid material to the mixing container comprises feeding a continuous feed of one of particles of coal and particles of an abrasive material to the mixing container.

7. The method of claim 1, wherein mixing particles of a solid material and particles of solid carbon dioxide in a mixing container comprises mixing the particles of the solid material and the particles of solid carbon dioxide in the mixing container at an ambient pressure.

8. The method of claim 1, wherein mixing particles of a solid material and particles of solid carbon dioxide in a mixing container comprises feeding a continuous feed of the particles of solid carbon dioxide to the mixing container.

9. The method of claim 8, wherein feeding a continuous feed of the particles of solid carbon dioxide to the mixing container comprises adiabatically expanding a liquid carbon dioxide feed stream to form the particles of solid carbon dioxide.

10. The method of claim 9, wherein adiabatically expanding a liquid carbon dioxide feed stream to form the particles of solid carbon dioxide comprises directing the liquid carbon dioxide through a spray nozzle into the mixing container.

11. The method of claim 1, further comprising feeding the slurry of the solid material and the liquid carbon dioxide to a reactor.

12. The method of claim 11, further comprising combusting the slurry of the solid material and the liquid carbon dioxide to produce a syngas comprising hydrogen and carbon dioxide.

13. The method of claim 12, further comprising separating the hydrogen in a gas state from the carbon dioxide in a liquid state.

14. The method of claim 13, further comprising solidifying the separated liquid carbon dioxide to form additional particles of solid carbon dioxide and feeding the additional particles of solid carbon dioxide to the mixing container.

15. The method of claim 1, further comprising transporting the slurry of the solid material and the liquid carbon dioxide through a pipeline.

16. The method of claim 1, wherein mixing particles of a solid material and particles of solid carbon dioxide in a mixing container comprises mixing the particles of solid carbon dioxide with particles of at least one of sulfur, petroleum coke, and limestone.

17. The method of claim 1, wherein mixing particles of a solid material and particles of solid carbon dioxide in a mixing container comprises mixing the particles of solid carbon dioxide with particles of an abrasive material other than coal.

18. A method of continuously producing a pressurized slurry, comprising:

feeding a mixture of a solid material and solid carbon dioxide into a first cavity of a progressive cavity pump;

sublimating at least a portion of the solid carbon dioxide within the first cavity to form a gaseous carbon dioxide;

increasing the pressure in a second cavity of the progressive cavity pump;

liquefying at least a portion of the gaseous carbon dioxide within the second cavity to form a liquid carbon dioxide; and mixing the liquid carbon dioxide and the solid material in a third cavity of the progressive cavity pump to form a pressurized slurry.

19. The method of claim 18, wherein feeding a mixture of a solid material and solid carbon dioxide into a first cavity of the progressive cavity pump comprises feeding a mixture of the solid material and the solid carbon dioxide at ambient pressure into the first cavity of the progressive cavity pump.

20. The method of claim 18, wherein mixing the liquid carbon dioxide and the solid material in a third cavity of the progressive cavity pump forming a pressurized slurry comprises forming the pressurized slurry having a pressure at least about 830 psi.

21. The method of claim 18, further comprising adding additional liquid carbon dioxide to the pressurized slurry.

* * * * *